US008928631B2

(12) United States Patent
Cho et al.

(10) Patent No.: US 8,928,631 B2
(45) Date of Patent: Jan. 6, 2015

(54) TRAJECTORY-ESTIMATION APPARATUS AND METHOD BASED ON PEN-TYPE OPTICAL MOUSE

(75) Inventors: Seong-Il Cho, Seoul (KR); Kyu-Yong Kim, Yongin-si (KR); Won-Chul Bang, Seongnam-si (KR); Sung-Jung Cho, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1206 days.

(21) Appl. No.: 12/155,752

(22) Filed: Jun. 9, 2008

(65) Prior Publication Data

US 2009/0027343 A1 Jan. 29, 2009

(30) Foreign Application Priority Data

Jul. 27, 2007 (KR) .......................... 10-2007-0075813

(51) Int. Cl.
*G06F 3/033* (2013.01)
*G06F 3/03* (2006.01)
*G06F 3/0354* (2013.01)
*G06K 9/00* (2006.01)
*G09G 5/08* (2006.01)

(52) U.S. Cl.
CPC ................ *G06F 3/0317* (2013.01); *G09G 5/08* (2013.01); *G06F 3/03545* (2013.01); *G06K 9/00409* (2013.01)
USPC ........................................................ 345/179

(58) Field of Classification Search
USPC .................................................. 345/179–183
See application file for complete search history.

(56) References Cited

U.S. PATENT DOCUMENTS

| 5,149,919 | A  | * | 9/1992  | Greanias et al. ........... 178/18.02 |
| 5,166,666 | A  | * | 11/1992 | Tanaka .......................... 345/179 |
| 5,434,370 | A  | * | 7/1995  | Wilson et al. .............. 178/19.01 |
| 5,889,889 | A  | * | 3/1999  | Sinden .......................... 382/187 |
| 6,340,967 | B1 | * | 1/2002  | Maxted ......................... 345/179 |
| 6,343,519 | B1 | * | 2/2002  | Callicott et al. ............. 73/865.7 |
| 6,573,887 | B1 | * | 6/2003  | O'Donnell, Jr. ............. 345/179 |
| 6,625,314 | B1 | * | 9/2003  | Okamoto ...................... 382/188 |
| 6,788,297 | B2 | * | 9/2004  | Itoh et al. ..................... 345/179 |
| 6,898,315 | B2 | * | 5/2005  | Guha ............................ 382/187 |
| 6,903,730 | B2 | * | 6/2005  | Mathews et al. ............. 345/179 |
| 6,930,672 | B1 | * | 8/2005  | Kuribayashi .................. 345/173 |
| 6,973,214 | B1 | * | 12/2005 | Shim et al. .................... 382/186 |
| 7,098,894 | B2 | * | 8/2006  | Yang et al. .................... 345/166 |
| 7,190,353 | B2 | * | 3/2007  | Cheng .......................... 345/173 |
| 7,330,590 | B2 | * | 2/2008  | Seto et al. ..................... 382/187 |
| 7,495,658 | B2 | * | 2/2009  | Kubo et al. ................... 345/173 |

(Continued)

FOREIGN PATENT DOCUMENTS

| KR | 1993-020304    | 10/1993 |
| KR | 1994-0003620   | 4/1994  |
| KR | 10-2006-0092507 | 8/2006  |

*Primary Examiner* — Jason Mandeville
(74) *Attorney, Agent, or Firm* — Staas & Halsey LLP

(57) ABSTRACT

A trajectory-estimation apparatus and method that can estimate the trajectory of a pen-type optical mouse in a pen-up state. The trajectory-estimation apparatus includes a timer module calculating time for which an optical input device moves in a first state of the optical input device that produces a trajectory, and a trajectory-estimation module estimating the trajectory of the optical input device in a period where a distance between the optical input device and a work surface exceeds a threshold value, based on at least one of the calculated time and a moving speed of the optical input device.

9 Claims, 8 Drawing Sheets

(56) References Cited

U.S. PATENT DOCUMENTS

| | | | |
|---|---|---|---|
| 7,742,628 B2 * | 6/2010 | Bang et al. | 382/122 |
| 2004/0184659 A1 * | 9/2004 | Bang et al. | 382/186 |
| 2006/0140480 A1 * | 6/2006 | Seto et al. | 382/187 |
| 2008/0288895 A1 * | 11/2008 | Hollemans et al. | 715/863 |

* cited by examiner

TRAJECTORY-ESTIMATION APPARATUS AND METHOD BASED ON PEN-TYPE OPTICAL MOUSE

CROSS-REFERENCE TO RELATED APPLICATIONS

This application is based on and claims priority from Korean Patent Application No. 10-2007-0075813, filed on Jul. 27, 2007 in the Korean Intellectual Property Office, the disclosure of which is incorporated herein in its entirety by reference.

BACKGROUND

1. Field

Embodiments of the present invention relate to a pen-type optical mouse, and more particularly to a trajectory-estimation apparatus and method that can estimate the trajectory of a pen-type optical mouse in a pen-up state.

2. Description of the Related Art

A conventional pen-type character-input system is provided with a microcode entered in advance, indicating coordinates for a paper used for character input, and estimates the trajectory of a pen through optical-position-recognition technology. Another conventional pen-type character-input system performs a character input by recognizing coordinates according to a movement of an electronic pen while a user takes notes on a tablet or an electronic pen that can recognize coordinates using the electronic pen, and restoring the trajectory of the electronic pen. Such systems based on absolute coordinates perform the pen-trajectory restoration relatively well, but require installation of an additional reference system (i.e., tablet or electronic pen) for providing the absolute coordinates.

In order to overcome such a problem, attempts have been made to create a character-input system based on relative coordinates, instead of the absolute coordinates, using an inertial sensor. As an example, a system for restoring the trajectory by calculating the movement of a pen tip using an inertial sensor only has been proposed. Under this system, however, the accumulated error of the inertial sensor becomes greater over time, and thus an apparatus for compensating the accumulated error is additionally required. As another example, a system for calculating relative coordinates using a ball mouse in a pen-down state and estimating the trajectory of a pen-type mouse using an inertial sensor in a pen-up state has been proposed. However, this system requires two kinds of sensor modes for pen-up and pen-down states.

SUMMARY

Accordingly, embodiments of the present invention have been made to solve the above-mentioned problems occurring in the prior art, and an object of embodiments of the present invention is to provide a trajectory-estimation apparatus and method that can estimate not only the trajectory of a pen-type optical mouse in a pen-down state but also the trajectory of the pen-type optical mouse in a pen-up state, in which detection is impossible, using only an optical mouse without any additional correction devices or sensors in a relative coordinate system.

Additional aspects and/or advantages will be set forth in part in the description which follows and, in part, will be apparent from the description, or may be learned by practice of the invention.

In order to accomplish these objects, there is provided a trajectory-estimation apparatus, according to embodiments of the present invention, which includes a timer module calculating time for which an optical input device moves in a first state of the optical input device that produces a trajectory, and a trajectory-estimation module estimating the trajectory of the optical input device in a period where a distance between the optical input device and a work surface exceeds a threshold value, based on at least one of the calculated time and a moving speed of the optical input device.

In another aspect of embodiments of the present invention, there is provided a trajectory-estimation method, which includes calculating time for which an optical input device moves in a first state of the optical input device that produces a trajectory, and estimating the trajectory of the optical input device in a period where a distance between the optical input device and a work surface exceeds a threshold value, based on at least one of the calculated time and a moving speed of the optical input device.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
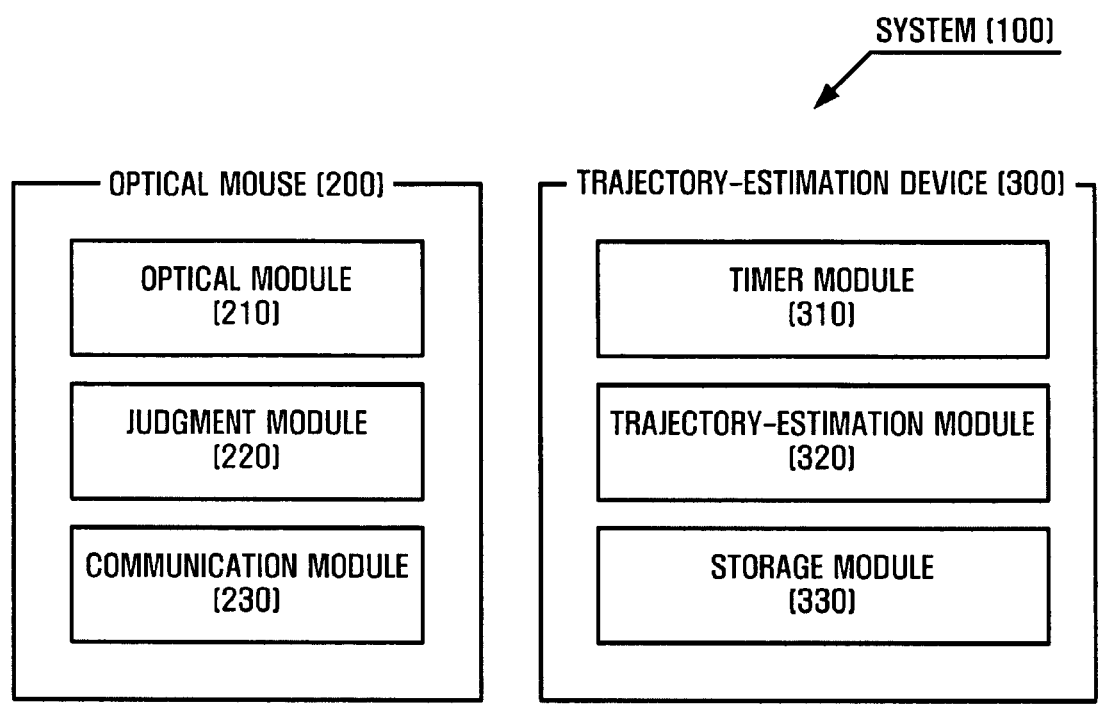
FIG. 1 illustrates the components of a pen-type optical-mouse trajectory-estimation system according to an embodiment of the present invention.

Reference will now be made in detail to the embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates the components of a pen-type optical-mouse trajectory-estimation system 100 according to an embodiment of the present invention.

As illustrated in FIG. 1, the pen-type optical-mouse trajectory-estimation system 100 according to an embodiment of the present invention, includes a pen-type optical mouse 200, and a trajectory-estimation device 300. Although FIG. 1 exemplifies the system 100 that includes the pen-type optical mouse, the system 100 according to embodiments of the present invention may include an optical input device instead of the pen-type optical mouse 200.

Figure 2:
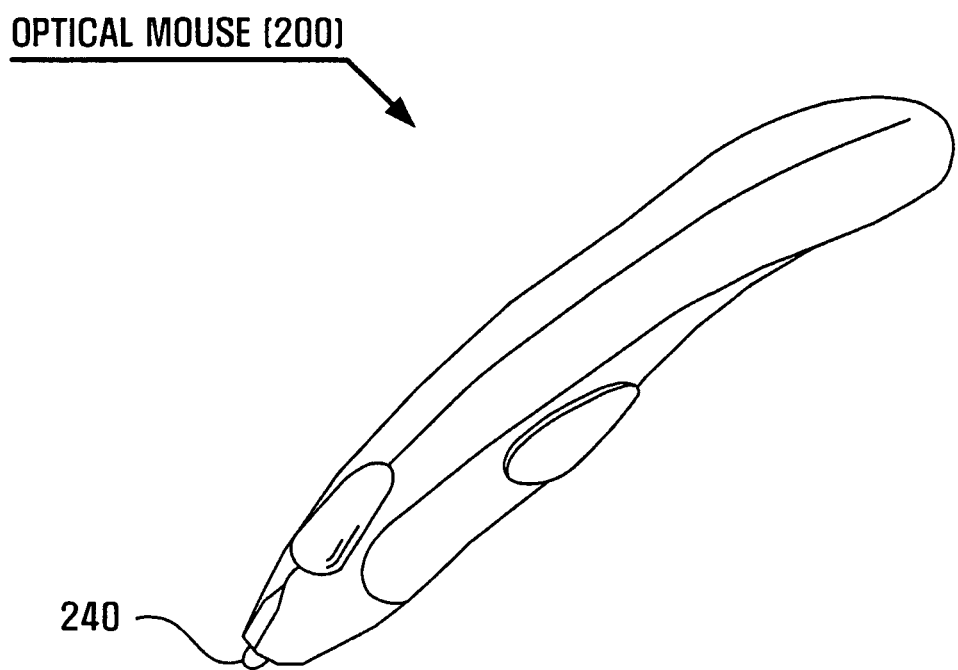
FIG. 2 illustrates an external appearance of a pen-type optical mouse according to an embodiment of the present invention.

The pen-type optical mouse 200 is an optical mouse having a pen function of a tablet, and has an external appearance as illustrated in FIG. 2. The pen-type optical mouse 200 includes an optical module 210, a judgment module 220, and a communication module 230.

The optical module 210 recognizes the movement of the mouse 200. Specifically, the optical sensor may acquire the moving distance and direction of the mouse 200 by comparing changes of images obtained through scanning of a work surface several thousand times per second. For this, the optical module 210 may include an optical sensor such as a charge coupled device (CCD). The optical sensor has an optical margin of a predetermined size. The optical margin is a distance in which the optical sensor can recognize the movement of the mouse 200. That is, if the distance between the mouse 200 and the work surface is within the optical margin, the optical sensor can recognize the trajectory of the mouse 200. However if the distance between the work surface and the mouse 200 exceeds the optical margin, the optical sensor cannot recognize the trajectory of the mouse 200. The trajectory of the mouse 200 that is recognized through the optical sensor may be provided to the trajectory-estimation device 300 to be described later.

The judgment module 220 judges whether the mouse is in a pen-down state or in a pen-up state. Specifically, the judgment module 220 can judge whether the mouse is in a pen-down state or in a pen-up state depending on whether a pen tip 240 (shown in FIG. 2) of the mouse 200 is pressed with more than a predetermined force. That is, when the pen tip 240 of the mouse 200 is in contact with the work surface and is pressed with more than the predetermined force, the judgment module 220 judges that the mouse 200 is in a pen-down state. If the pen tip 240 of the mouse 200 is separated from the work surface and is pressed with less than the predetermined force, the judgment module 220 judges that the mouse 200 is in a pen-up state.

While a user writes a word using the mouse 200, the state of the mouse 200 may be continuously changed. For example, it is assumed that a user writes a word composed of a first spelling and a second spelling using the mouse 200. The process of writing a word may include a process of writing the first spelling, a process of moving the position of the mouse 200 in order to write the second spelling, and a process of writing the second spelling. At this time, the pen tip 240 that is in contact with the work surface is pressed with more than the predetermined force during the writing of the first spelling, and thus the mouse 200 is kept in a pen-down state. However, while the mouse 200 is moved in order to write the second spelling, the strength to press the pen tip 240 of the mouse 200 is lowered below the predetermined level. Accordingly, the judgment module 220 judges that the mouse 200 is in a pen-up state. Thereafter, the pen tip 240 of the mouse 200 comes in contact with the work surface again and is pressed with more than the predetermined force during the writing of the second spelling. Accordingly, the judgment module 220 judges that the mouse 200 is in a pen-up state. The result of judging the state of the mouse 200 through the judgment module 220 may be provided to the trajectory-estimation device 300 (described later).

The communication module 230 exchanges data with a communication module (not illustrated) of a digital device having the mouse 200 as its input means, such as a personal computer (PC) or a digital TV. In one embodiment of the present invention, the communication module 230 may use a wire communication protocol such as universal serial bus (USB) communications. In another embodiment of the present invention, the communication module 230 may use a wireless communication protocol such as Bluetooth and wireless USB.

Next, the trajectory-estimation device 300 estimates the trajectory of the mouse 200. Specifically, the trajectory-estimation device 300 estimates the trajectory of the mouse 200 in a pen-up state. For this, the trajectory-estimation device 300 includes a timer module 310, a trajectory-estimation module 320, and a storage module 330.

The timer module 310 calculates the time for which the mouse 200 moves after it is judged that the mouse 200 is in a pen-up state. Specifically, the timer module 310 calculates the time that corresponds to a period where the distance between the mouse 200 and the work surface is less than the optical margin, and the time that corresponds to a period where the distance between the mouse 200 and the work surface exceeds the optical margin, in the trajectory of the mouse 200 after it is judged that the mouse 200 is in the pen-up state. The details thereof will be described with reference to FIGS. 3 and 4.

Figure 3:
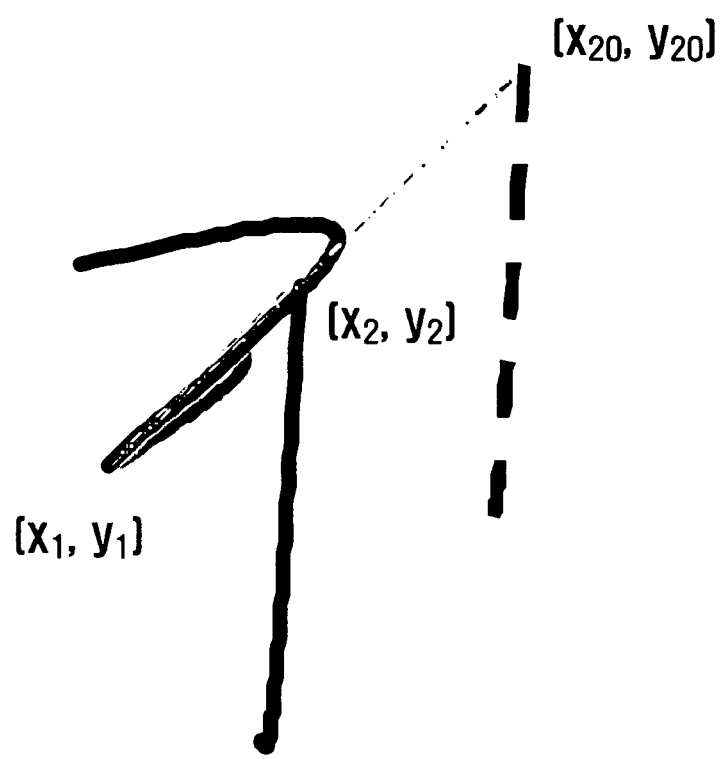
FIG. 3 illustrates an example of a trajectory of a pen-type optical mouse.

FIG. 3 illustrates the actual trajectory of the mouse 200 and the trajectory sensed by the optical module 210 when a user writes a Hangul character ""가"", for example, using the mouse 200.

In FIG. 3, a dotted line indicates the actual trajectory of the mouse 200, and a solid line indicates the trajectory sensed by the optical module 210. In FIG. 3, the coordinates $(x_1, y_1)$ indicate the last coordinates of a Hangul consonant "ㄱ". The coordinates $(x_2, y_2)$ indicate the start coordinates of a Hangul vowel "ㅏ" sensed by the optical module 210, and the coordinates $(x_{20}, y_{20})$ indicate the actual start coordinates, designated by the user of the optical mouse, of the Hangul vowel "ㅏ".

The process of writing the Hangul character "가" includes a process of writing the Hangul consonant "ㄱ", a process of moving the position of the mouse 200 in order to write the Hangul vowel "ㅏ", and a process of writing the Hangul vowel "ㅏ". The mouse 200 is kept in a pen-down state while writing "ㄱ", and is kept in a pen-up state while it moves in order to write "ㅏ". Thereafter, the mouse 200 is kept again in the pen-down state while writing "ㅏ".

Figure 4:
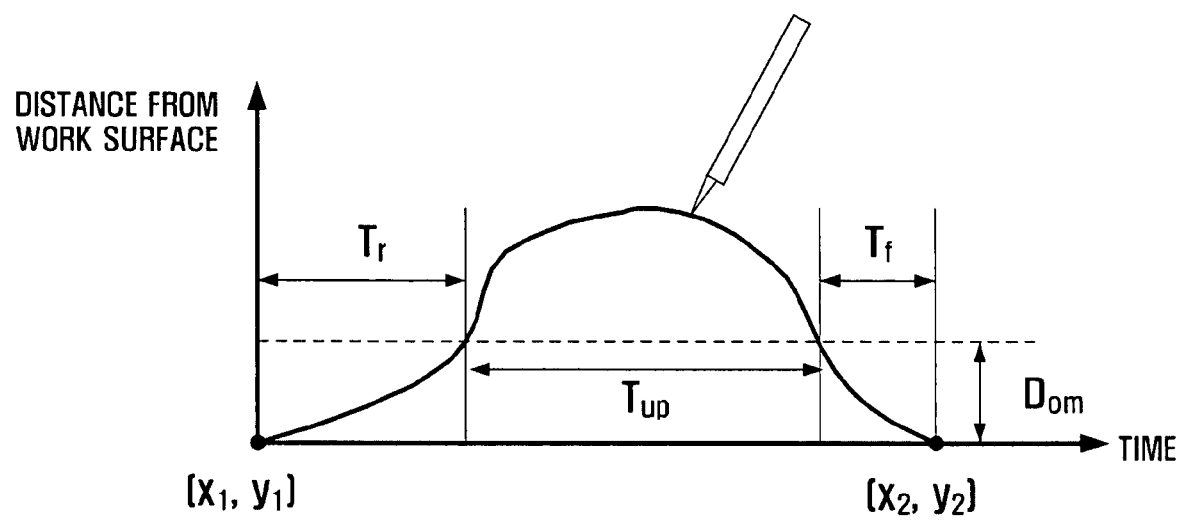
FIG. 4 illustrates the trajectory of a pen-type optical mouse in a pen-up state during the entire trajectory of the pen-type optical mouse.

FIG. 4 illustrates the trajectory of the mouse 200 while the mouse 200 is kept in a pen-up state. In FIG. 4, the horizontal axis indicates the moving time of the mouse 200, and the vertical axis indicates the distance between the work surface and the mouse 200. The term "$D_{om}$" indicates the optical margin of the optical module 210 as described above.

Referring to FIG. 4, it can be seen that the trajectory of the mouse 200 while the mouse is kept in a pen-up state includes three periods: a period where the distance between the mouse 200 and the work surface is below the optical margin and the mouse 200 becomes more distant from the work surface (hereinafter referred to as a "first period"), a period where the distance between the mouse 200 and the work surface exceeds the optical margin (hereinafter referred to as a "second period"), and a period where the distance between the mouse 200 and the work surface is below the optical margin and the mouse 200 becomes closer to the work surface (hereinafter referred to as a "the third period").

Referring to FIGS. 1 and 4, the timer module 310 calculates a first time $T_r$, a second time $T_{up}$, and a third time $T_f$, which correspond to the first period, the second period, and the third period, respectively.

The first time $T_r$, is obtained by calculating the time from the moment it is judged that the mouse 200 is in a pen-up state to the moment the distance between the mouse 200 and the work surface becomes equal to the optical margin. At this time, the moment the distance between the mouse 200 and the work surface becomes equal to the optical margin can be judged based on the moment the trajectory of the mouse 200 is not sensed any more. Specifically, if the mouse 200 becomes more distant from the work surface and the distance between the mouse 200 and the work surface exceeds the optical margin, the trajectory of the mouse 200 is not sensed any more through the optical module 210. If the trajectory of the mouse 200 is not sensed any more, the timer module 310 calculates the first time based on the moment the trajectory of the mouse 200 is not sensed any more.

The second time $T_{up}$, is obtained by calculating the time from the moment the trajectory of the mouse 200 is not sensed to the moment the trajectory of the mouse 200 is sensed again.

The third time $T_f$ is obtained by calculating the time from the moment the trajectory of the mouse 200 is sensed again to the moment it is judged that the mouse 200 is in a pen-down state. Specifically, if the mouse 200, which moves in a state that the distance between the mouse and the work surface exceeds the optical margin, enters into the optical margin range, the optical module 210 can sense the trajectory of the mouse 200 again. Thereafter, if the mouse 200 comes closer to the work surface and the pen tip 240 of the mouse 200 is pressed with more than the predetermined force, the judgment module 220 judges that the mouse 200 is in a pen-down state. Accordingly, the timer module 310 can calculate the third time $T_f$ based on the moment it is judged that the mouse 200 is in a pen-down state.

The trajectory-estimation module 320 receives the result of judging the mouse state from the judgment module 220, and controls the operation of the timer module 310 accordingly. Specifically, if the state of the mouse 200 is changed from the pen-down state to the pen-up state, the trajectory-estimation module 320 operates the timer module 310 to perform a time count. Thereafter, if the state of the mouse 200 is changed from the pen-up state to the pen-down state, the trajectory-estimation module 320 stops the operation of the timer module 310.

Then, the trajectory-estimation module 320 estimates the trajectory of the mouse in the period where the mouse is kept in a pen-up state, i.e., in the second period, based on the moving speed of the mouse 200 and data (i.e., the first time $T_r$, the second time $T_{up}$, and the third time $T_f$) provided from the timer module 310. Hereinafter, the trajectory of the mouse 200 in the pen-up state, i.e., in the second period, is called an offset.

On the assumption that the mouse 200 moves in the same direction and at the same speed, the trajectory-estimation module 320 calculates the offset by multiplying an average speed of the mouse while the mouse 200 is kept in a pen-up state by the time for which the actual movement of the mouse occurs but the coordinates are not changed. In other words, the trajectory-estimation module 320 calculates the offset by multiplying the average speed of the mouse by the time that corresponds to the second period in the second period. Here, the position of the mouse 200 is indicated by an x-coordinate and a y-coordinate. In this case, the trajectory-estimation module 320 calculates the offset for the x-coordinate (hereinafter referred to as a "first offset") and the offset for the y-coordinate (hereinafter referred to as a "second offset").

Specifically, as illustrated in FIG. 4, if it is assumed that the last coordinates of the mouse 200 in a pen-down state, when the state of the mouse 200 is changed from the pen-down state to the pen-up state, are $(x_1, y_1)$, the start coordinates when the state of the mouse 200 is again changed from the pen-up state to the pen-down state are $(x_2, y_2)$, and the first to third times are $T_r$, $T_{up}$, and $T_f$, respectively, the first offset $x_{off}$ and the second offset $y_{off}$ can be expressed, for example by Equation (1), as shown below.

$$x_{off} = \left(\frac{T_{up}}{T_r + T_f + T_{up}}\right) \times (x_2 - x_1),$$

$$y_{off} = \left(\frac{T_{up}}{T_r + T_f + T_{up}}\right) \times (y_2 - y_1)$$

Equation (1)

Here, when the first offset $x_{off}$ and the second offset $y_{off}$ are calculated using Equation (1), the trajectory-estimation module 320 adds the calculated offsets to the start coordinates $(x_2, y_2)$ when the state of the mouse 200 is changed again to the pen-down state. That is, as expressed, for example in Equation (2) below, at the start coordinates $(x_2, y_2)$, the first offset $x_{off}$ is added to $x_2$, and the second offset $y_{off}$ is added to $y_2$. As a result, corrected coordinates $(x_2', y_2')$ for the start coordinates can be obtained.

$$x_2' = x_2 + x_{off}$$

$$y_2' = y_2 + y_{off}$$

Equation (2):

The storage module 330 stores data required for the trajectory of the mouse 200 in a pen-up state. For example, the last coordinates $(x_1, y_1)$ in a pen-down state when the state of the mouse 200 is changed from a pen-down state to a pen-up state, the times corresponding to the respective periods in a pen-up state, the start coordinates $(x_2, y_2)$ when the state of the mouse 200 is changed again to the pen-down state, and so forth, are stored in the storage module 330. The storage module may be implemented by, but is not limited to, at least one of a nonvolatile memory device, such as a cache, ROM, programmable ROM (PROM), erasable programmable ROM (EPROM), electrically erasable programmable ROM (EEPROM), and flash memory, or a volatile memory device such as a RAM.

In one embodiment of the present invention, the above-described trajectory-estimation device 300 may be included in the mouse 200. In the case where the trajectory-estimation device 300 is included in the mouse 200, the corrected coordinates $(x_2', y_2')$ calculated through Equation (2) may be transmitted to a digital device through the communication module 230 of the mouse 200.

In another embodiment of the present invention, the trajectory-estimation device 300 may be included in the digital device. In the case where the trajectory-estimation device 300 is included in the digital device, the data required for trajectory estimation may be provided to the digital device through the communication module 230 of the mouse 200. Here, the data provided to the digital device may be the trajectory of the mouse 200 that is recognized by the optical module 210, the result of judging the state of the mouse 200 through the judgment module 220, and so forth.

In still another embodiment of the present invention, the respective components of the trajectory-estimation device 300 may be included in the digital device and the mouse 200. For example, the trajectory-estimation module 320 of the trajectory-estimation device 300 may be included in the digital device, and the timer module 310 may be included in the mouse 200. By contrast, the timer module of the trajectory-estimation device 300 may be included in the digital device, and the trajectory-estimation module 320 may be included in the mouse 200. In this case, the timer module 310 may be identical to the existing timer module provided in the digital device.

Figure 5:
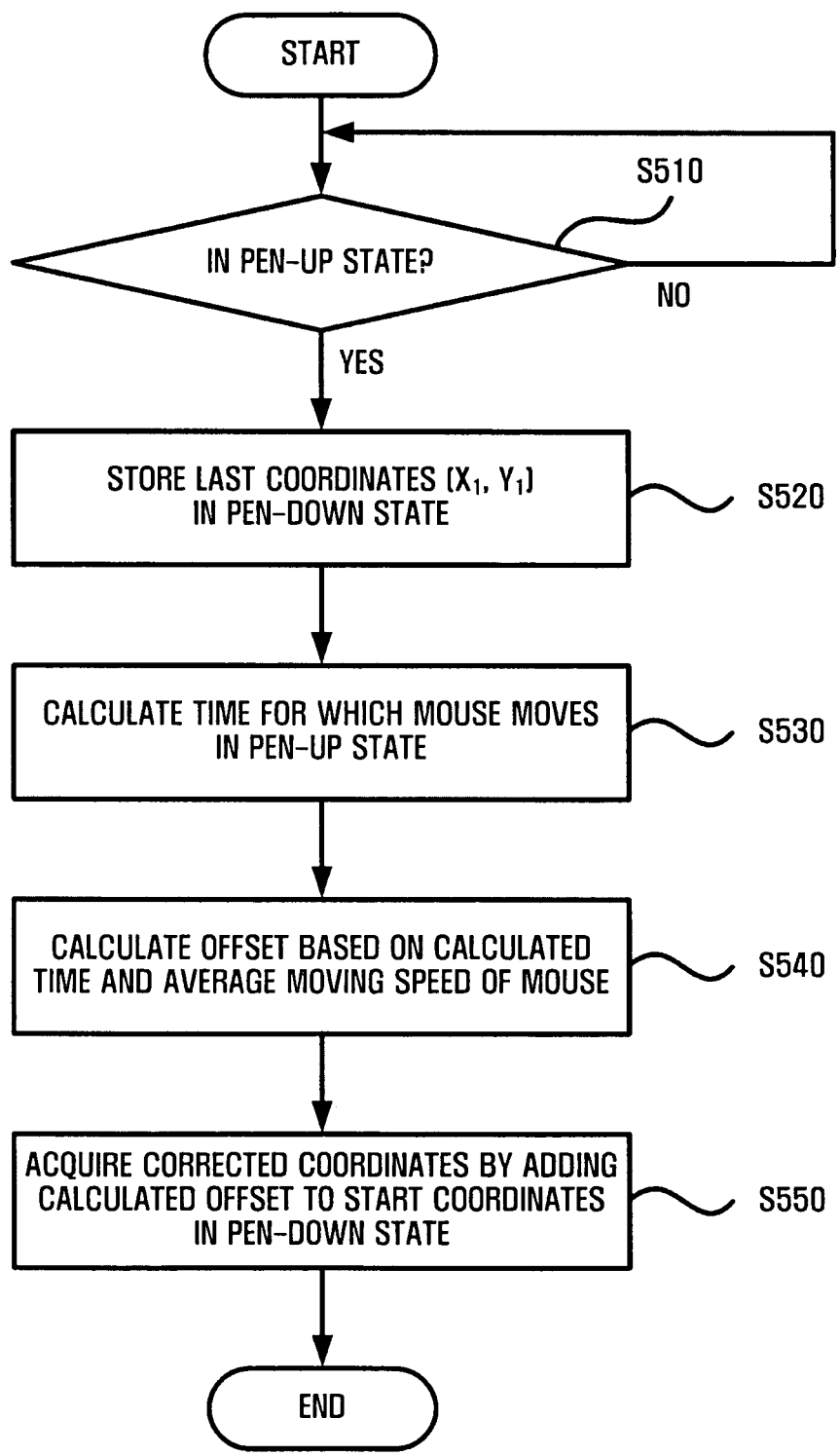
FIG. 5 is a flowchart illustrating a pen-type optical mouse trajectory-estimation method according to an embodiment of the present invention.

FIG. 5 is a flowchart illustrating a pen-type optical mouse trajectory-estimation method according to an embodiment of the present invention.

Hereinafter, for explanatory convenience, FIG. 5 illustrates an example where a user writes a Hangul character "가" using the mouse 200 as described above with reference to FIGS. 3 and 4.

Referring now to FIGS. 1 and 5, first, it is judged whether the state of the mouse 200 is changed to a pen-up state S510. The change of the state of the mouse 200 can be judged based on a pressure applied to the pen tip 240 of the mouse 200. For example, if a pressure over a predetermined force is applied to the pen tip 240, it is judged that the mouse 200 is in a pen-down state. If the pressure being applied to the pen tip 240 is lowered below the predetermined force in a pen-down state, it is judged that the mouse 200 is in a pen-up state. For example, S510 may be performed by the judgment module 220.

If it is judged that the state of the mouse 200 is changed from a pen-down state to a pen-up state ("Yes" in S510), the last coordinates $(x_1, y_1)$ in a pen-down state are stored S520. S520 may be performed by the trajectory-estimation module 320.

After the last coordinates $(x_1, y_1)$ in a pen-down state are stored, the time, for which the mouse 200 moves in a pen-up state, is calculated S530. S530 may be performed by the timer module 310. S530 may include calculating the first time, calculating the second time, and calculating the third time. Here, S530 will be described in more detail with reference to FIG. 6.

Figure 6:
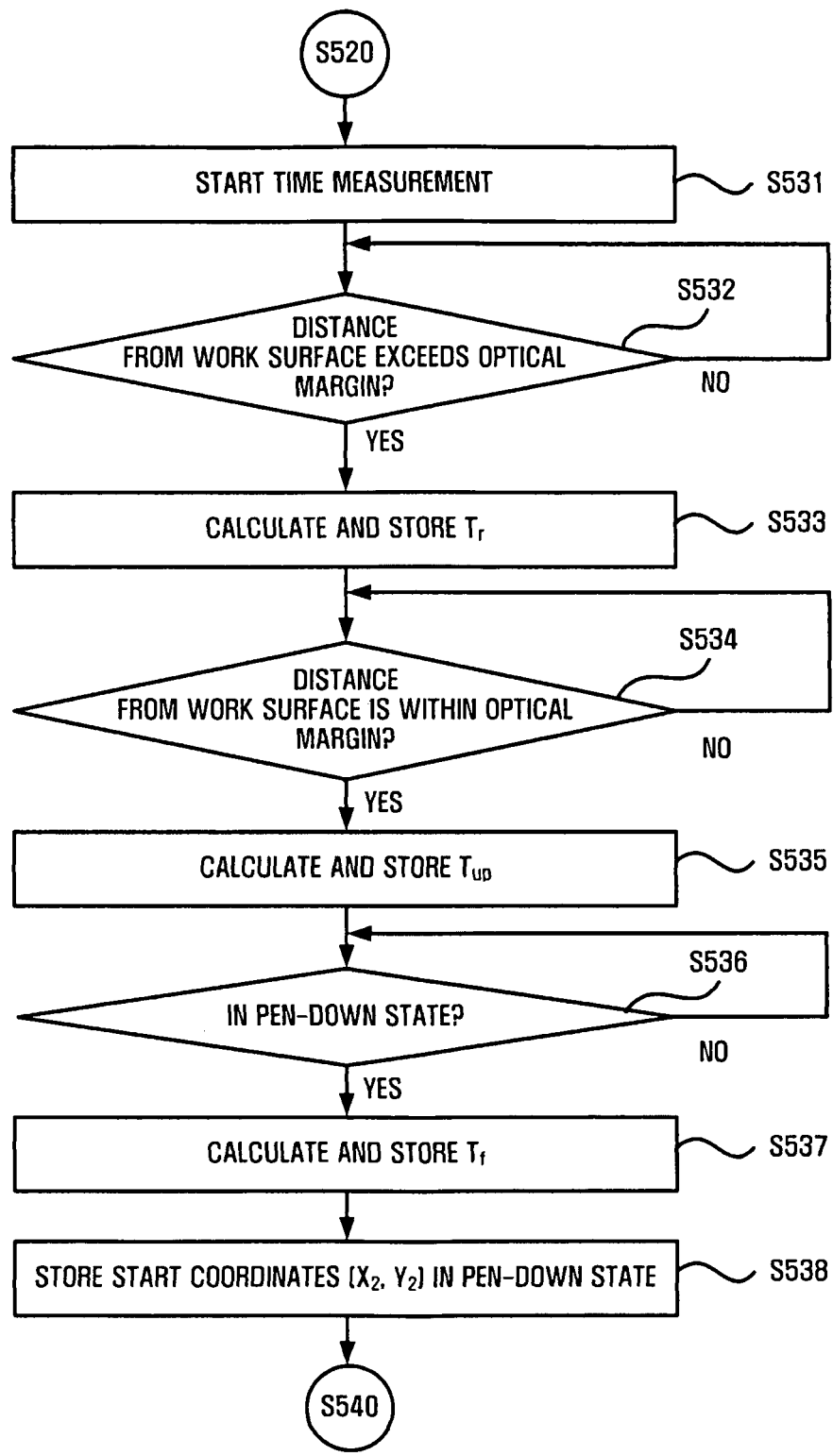
FIG. 6 is a flowchart illustrating in more detail the step S530 of calculating time for which a mouse moves in a pen-up state as illustrated in FIG. 5.

Referring now to FIG. 6, if the state of the mouse 200 is changed from a pen-down state to a pen-up state, the timer module 310 operates to start a time measurement S531.

Then, it is judged whether the distance between the mouse 200 and the work surface exceeds the optical margin S532. This judgment may be performed based on the moment the trajectory of the mouse 200 is not sensed any more. This is because the fact that the trajectory of the mouse 200 is not sensed means that the distance between the mouse 200 and the work surface exceeds the optical margin.

If the distance between the mouse 200 and the work surface exceeds the optical margin as a result of judgment ("Yes" in S532), the time from the moment the time measurement starts to the moment the distance between the mouse 200 and the work surface reaches the optical margin, i.e., the first time $T_r$, is calculated S533. In this case, the calculated first time $T_r$ is stored in the storage module 330.

Then, it is judged whether the distance between the mouse 200 and the work surface is within the optical margin S534. This judgment may be performed based on the moment the trajectory of the mouse 200 is sensed again. This is because the fact that the trajectory of the mouse 200 is sensed again means that the distance between the mouse 200 and the work surface is within the optical margin.

If the distance between the mouse 200 and the work surface is within the optical margin as a result of judgment ("Yes" in S534), the time from the moment the distance between the mouse 200 and the work surface exceeds the optical margin till the moment the distance between the mouse 200 and the work surface becomes equal to the optical margin, i.e., the second time $T_{up}$, is calculated S535. In this case, the calculated second time $T_{up}$ is stored in the storage module 330.

Then, it is judged that the state of the mouse 200 is changed to a pen-down state S536. If the state of the mouse 200 is changed to a pen-down state as a result of judgment ("Yes" in S536), the time from the moment the distance between the mouse 200 and the work surface becomes equal to the optical margin to the moment the state of the mouse 200 is changed to a pen-down state, i.e., the third time $T_f$, is calculated S537. Also, the start coordinates $(x_2, y_2)$ in the pen-down state is stored S538. In this case, the calculated third time $T_f$ and the start coordinates $(x_2, y_2)$ are stored in the storage module 330.

Referring again to FIG. 5, the offset is calculated based on the calculated time and an average speed of the mouse 200 in a pen-up state S540. In the case where the trajectory of the mouse 200 is indicated as the x, y coordinates, the first offset $x_{off}$ for the x coordinate and the second offset $y_{off}$ for the y coordinate can be calculated. For this, the above-described Equation (1) may be used.

Then, as shown in Equation 2, the corrected coordinates $(x_2', y_2')$ for the start coordinates are obtained by adding the calculated offsets to the start coordinates $(x_1, y_1)$ in a pen-down state S550. The corrected coordinates $(x_2', y_2')$ may be provided to the digital device through the communication module 230 of the mouse 200.

FIGS. 7A to 7C and 8A to 8C illustrate the result of trajectory estimation according to the trajectory-estimation method according to an embodiment of the present invention.

Figure 7A:
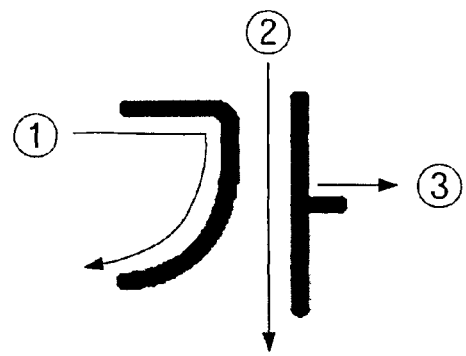
FIG. 7A illustrates typical trajectories of a Hangul character "가"
Figure 7B:
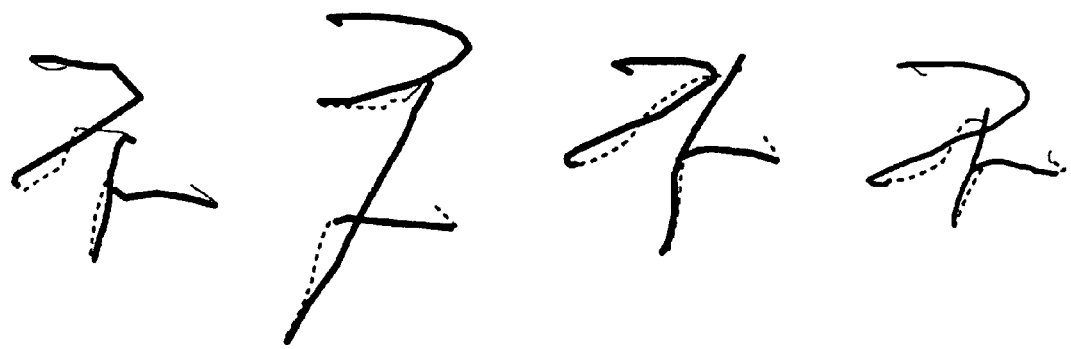
FIG. 7B illustrates the trajectory of an optical mouse before an offset correction when a user writes the Hangul character "가" of FIG. 7A with the optical mouse.
Figure 7C:
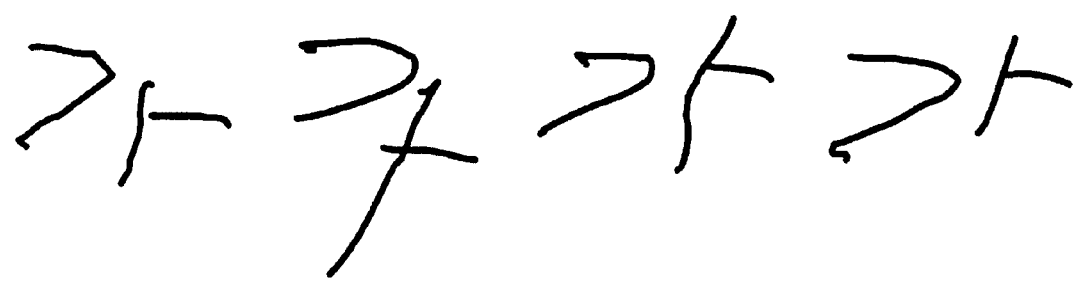
FIG. 7C illustrates the trajectory of an optical mouse after an offset correction when a user writes the Hangul character "가" of FIG. 7A with the optical mouse.

FIG. 7A illustrates typical trajectories of a Hangul character "가", and FIG. 7B is a view illustrating the trajectory of the mouse 200 before an offset correction when a user writes the Hangul character "가" with the mouse 200. FIG. 7C is a view illustrating the trajectory of an optical mouse 200 after the offset correction.

In FIG. 7B, the trajectory marked in dotted line indicates the trajectory in the first period, and the trajectory marked in thin solid line indicates the trajectory in the third period. Referring to FIG. 7B, it can be seen that the interval between the Hangul consonant "ㄱ" and the Hangul vowel "ㅏ" is too narrow or superimposed. By contrast, referring to FIG. 7C, the interval between the Hangul consonant "ㄱ" and the Hangul vowel "ㅏ" is proper. That is, the offset-corrected letters are closer to their original forms in comparison to the letters of which the offset is not corrected.

Figure 8A:
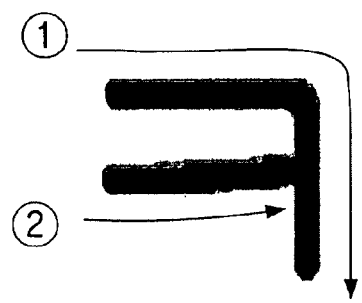
FIG. 8A illustrates typical trajectories of the Hangul consonant "ㄱ"
Figure 8B:
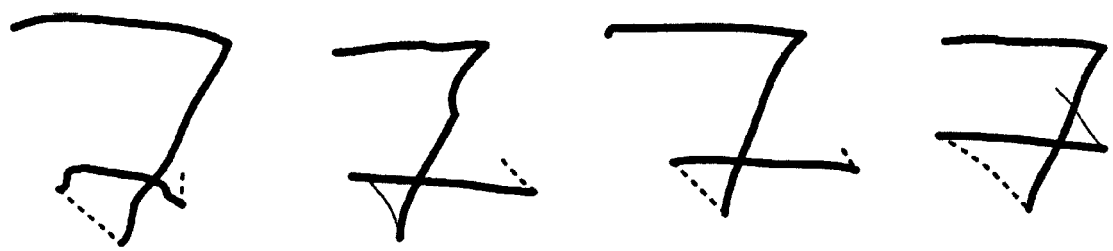
FIG. 8B illustrates the trajectory of an optical mouse before an offset correction when a user writes the Hangul consonant "ㄱ" with the optical mouse.
Figure 8C:
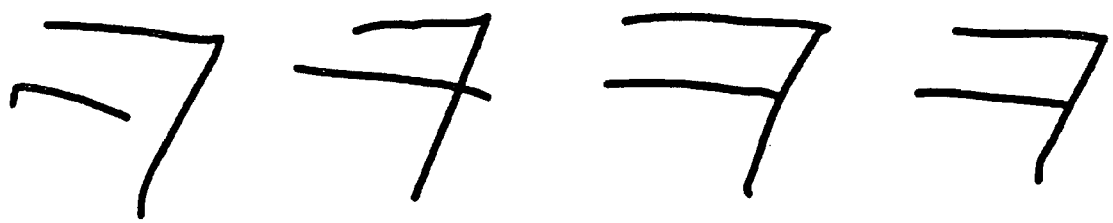
FIG. 8C illustrates the trajectory of an optical mouse after an offset correction when a user writes the Hangul consonant "ㄱ" with the optical mouse.

FIG. 8A illustrates typical trajectories of a Hangul consonant "ㅋ". FIG. 8B is a view illustrating the trajectory of the mouse 200 before the offset correction when a user writes the Hangul consonant "ㅋ" with the optical mouse, and FIG. 8C illustrates the trajectory of the mouse 200 after the offset correction.

In FIG. 8B, the trajectory marked in dotted line indicates the trajectory in the first period, and the trajectory marked in thin solid line indicates the trajectory in the third period. Referring to FIGS. 8B and 8C, the offset-corrected letters are much closer to their original forms in comparison to the letters of which the offset is not corrected.

As described above, the trajectory-estimation apparatus and method based on a pen-type optical mouse according to the embodiments of the present invention has the following effects.

The trajectory of the pen-type optical mouse in a pen-down state and the trajectory of the pen-type optical mouse in a pen-up state can be estimated using only the optical mouse without any additional correction device or sensor.

Since the trajectory of the pen-type optical mouse in a pen-up state is estimated and corrected, the character-recognition rate can be improved.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). Also, computer readable code can be transferred through transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an optical input device which includes an optical sensor having an optical margin which is a distance from a work surface in which the optical sensor is able to recognize movement of the optical input device, the optical input device movable over a total time, during which the optical input device is not in contact with the work surface, from a first position in which the optical input device is in contact with the work surface to a second position in which the optical input device is in contact with the work surface, the total time including
      a first time period extending from a moment that the optical input device becomes no longer in contact with the work surface from being in the first position to a moment a distance between the optical input device and the work surface exceeds the optical margin,
      a second time period extending from the moment the distance between the optical input device and the work surface exceeds the optical margin to a moment the optical input device becomes within the optical margin, and
      a third time period from the moment the optical input device becomes within the optical margin to a moment the optical input device comes in contact with the work surface to thereby be in the second position; and
   a computer processor that calculates an offset by multiplying an average moving speed of the optical input device over the total time by the amount of time of the second time period, and calculates corrected coordinates of the second position by adding the offset to start coordinates of the second position.

2. The apparatus of claim 1, further comprising:
   a judgment module to judge a state of the optical input device.

3. The apparatus of claim 2, wherein the optical input device comprises a pen tip, and the judgment module judges that the optical input device is in a second state if the pen tip is in contact with a work surface and receives a pressure of more than a pressure threshold value, and judges that the optical input device is in a first state if the pen tip receives the pressure of less than the pressure threshold value;
   wherein the first state is a pen-up state, and the second state is a pen-down state, and the optical input device is in the first state during the total time.

4. The apparatus of claim 3, further comprising a timer module to calculate the first time period, the second time period and the third time period in accordance with a state of the optical input device as judged by the judgment module.

5. A method for use with an optical input device which includes an optical sensor having an optical margin which is a distance from a work surface in which the optical sensor is able to recognize movement of the optical input device, the optical input device movable over a total time, during which the optical input device is not in contact with the work surface, from a first position in which the optical input device is in contact with the work surface to a second position in which the optical input device is in contact with the work surface, the method comprising:
   by at least one computer processor:
      calculating a first time period of the total time extending from a moment that the optical input device becomes no longer in contact with the work surface from being in the first position to a moment a distance between the optical input device and the work surface exceeds the optical margin;
      calculating a second time period of the total time extending from the moment the distance between the optical input device and the work surface exceeds the optical margin to a moment the optical input device becomes within the optical margin;
      calculating a third time period of the total time from the moment the optical input device becomes within the optical margin to a moment the optical input device comes in contact with the work surface to thereby be in the second position;
      calculating an offset by multiplying an average moving speed of the optical input device over the total time by the amount of time of the second time period; and
      calculating corrected coordinates of the second position by adding the offset to start coordinates of the second position.

6. The method of claim 5, further comprising:
   judging a state of the optical input device.

7. The method of claim 6, wherein the optical input device includes a pen tip, and the judging comprises:
    judging that the optical input device is in a second state if the pen tip is in contact with a work surface and receives a pressure of more than a pressure threshold value; and
    judging that the optical input device is in a first state if the pen tip receives a pressure of less than the pressure threshold value;
    wherein the first state is a pen-up state, and the second state is a pen-down state, and the optical input device is in the first state during the total time.

8. The method of claim 7, wherein the optical input device is in the pen-down state at the first position and at the second position.

9. An apparatus comprising:
    an optical input device which includes an optical sensor having an optical margin which is a distance from a work surface in which the optical sensor is able to recognize movement of the optical input device, the optical input device movable over a total time, during which the optical input device is not in contact with the work surface, from a first position in which the optical input device is in contact with the work surface to a second position in which the optical input device is in contact with the work surface, the total time including
        a first time period extending from a moment that the optical input device becomes no longer in contact with the work surface from being in the first position to a moment a distance between the optical input device and the work surface exceeds the optical margin,
        a second time period extending from the moment the distance between the optical input device and the work surface exceeds the optical margin to a moment the optical input device becomes within the optical margin, and
        a third time period from the moment the optical input device becomes within the optical margin to a moment the optical input device comes in contact with the work surface to thereby be in the second position, and
    means for calculating an offset by multiplying an average moving speed of the optical input device over the total time by the amount of time of the second time period, and for calculating corrected coordinates of the second position by adding the offset to start coordinates of the second position.

* * * * *